(12) United States Patent
Jain et al.

(10) Patent No.: US 9,525,850 B2
(45) Date of Patent: Dec. 20, 2016

(54) DELIVERING AND DISPLAYING ADVERTISEMENT OR OTHER APPLICATION DATA TO DISPLAY SYSTEMS

(75) Inventors: Amit Jain, Sunnyvale, CA (US); Yatin Mundkur, Los Altos Hills, CA (US); Roger A. Hajjar, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 1151 days.

(21) Appl. No.: 12/052,709

(22) Filed: Mar. 20, 2008

(65) Prior Publication Data

US 2008/0235749 A1 Sep. 25, 2008

Related U.S. Application Data

(60) Provisional application No. 60/895,966, filed on Mar. 20, 2007.

(51) Int. Cl.
*H04N 5/445* (2011.01)
*H04N 7/173* (2011.01)
(Continued)

(52) U.S. Cl.
CPC .... *H04N 7/17318* (2013.01); *H04N 21/25891* (2013.01); *H04N 21/2668* (2013.01);
(Continued)

(58) Field of Classification Search
None
See application file for complete search history.

(56) References Cited

U.S. PATENT DOCUMENTS 3,025,161 A 3/1962 Thaddeus
3,556,637 A 1/1971 Palmquist
(Continued)

FOREIGN PATENT DOCUMENTS

DE 10044603 4/2001
EP 0196862 10/1986
(Continued)

OTHER PUBLICATIONS

Baudisch et al, Focus Plus Context Screens: Combining Display Technology with Visualization Techniques, Nov. 11-14, 2001, UIST '01, pp. 31-38.*

(Continued)

*Primary Examiner* — Pinkal R Chokshi
*Assistant Examiner* — Dika C Okeke
(74) *Attorney, Agent, or Firm* — Perkins Coie LLP

(57) ABSTRACT

Display devices and systems including television sets, and systems, apparatus and methods for delivering information and providing services through display devices and systems. The display used in the described systems and methods is capable of receiving one or more TV programming channels and an independent designated application channel and having at least a first display window and a second display window separated from each other without spatial overlap on the screen. The information sent over the designated application channel to the display is displayed on the first display window while simultaneously displaying one of the TV programming channels on the second display window. A viewer control mechanism is provided in the display to allow the viewer to switch the information received from the designated application channel from the first display window to the second display window and switch back at the viewer's choice.

13 Claims, 13 Drawing Sheets

(51) Int. Cl.
  *H04N 21/258* (2011.01)
  *H04N 21/262* (2011.01)
  *H04N 21/2668* (2011.01)
  *H04N 21/433* (2011.01)
  *H04N 21/443* (2011.01)
  *H04N 21/478* (2011.01)
  *H04N 21/61* (2011.01)
  *H04N 21/658* (2011.01)
  *H04N 21/81* (2011.01)

(52) U.S. Cl.
  CPC ... *H04N 21/26241* (2013.01); *H04N 21/4331* (2013.01); *H04N 21/4438* (2013.01); *H04N 21/478* (2013.01); *H04N 21/6131* (2013.01); *H04N 21/6581* (2013.01); *H04N 21/812* (2013.01)

(56) References Cited

U.S. PATENT DOCUMENTS

| | | |
|---|---|---|
| 3,691,482 A | 9/1972 | Pinnow et al. |
| 3,750,189 A | 7/1973 | Fleischer |
| 4,165,154 A | 8/1979 | Takahashi |
| 4,307,320 A | 12/1981 | Kotera et al. |
| 4,375,651 A | 3/1983 | Templin et al. |
| 4,401,362 A | 8/1983 | Maeda |
| 4,512,911 A | 4/1985 | Kotera et al. |
| 4,613,201 A | 9/1986 | Shortle et al. |
| 4,624,528 A | 11/1986 | Brueggemann |
| 4,661,419 A | 4/1987 | Nakamura |
| 4,707,093 A | 11/1987 | Testa |
| 4,816,920 A | 3/1989 | Paulsen |
| 4,923,262 A | 5/1990 | Clay |
| 4,979,030 A | 12/1990 | Murata |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,124,795 A | 6/1992 | Brusaw |
| 5,136,426 A | 8/1992 | Linden et al. |
| 5,138,441 A | 8/1992 | Tanaka |
| 5,140,604 A | 8/1992 | Alablanche et al. |
| 5,166,944 A | 11/1992 | Conemac |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,365,288 A | 11/1994 | Dewald et al. |
| 5,389,324 A | 2/1995 | Lewis et al. |
| 5,414,521 A | 5/1995 | Ansley |
| 5,473,396 A | 12/1995 | Okajima et al. |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,698,857 A | 12/1997 | Lambert et al. |
| 5,710,021 A | 1/1998 | Hintz et al. |
| 5,715,021 A | 2/1998 | Gibeau et al. |
| 5,716,118 A | 2/1998 | Sato et al. |
| 5,870,224 A | 2/1999 | Saitoh et al. |
| 5,882,774 A | 3/1999 | Jonza et al. |
| 5,900,916 A * | 5/1999 | Pauley .................. 725/59 |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker |
| 6,226,126 B1 | 5/2001 | Conemac |
| 6,252,254 B1 | 6/2001 | Soules et al. |
| 6,255,670 B1 | 7/2001 | Srivastava et al. |
| 6,276,802 B1 | 8/2001 | Naito |
| 6,285,368 B1 * | 9/2001 | Sudo .................. 345/419 |
| 6,288,817 B2 | 9/2001 | Rowe |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,986,581 B2 * | 1/2006 | Sun .................. G03B 21/60 353/31 |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,181,417 B1 | 2/2007 | Langseth et al. |
| 7,213,923 B2 | 5/2007 | Liu et al. |
| 7,230,767 B2 | 6/2007 | Walck et al. |
| 7,239,436 B2 | 7/2007 | Oettinger et al. |
| 7,283,301 B2 | 10/2007 | Peeters et al. |
| 7,302,174 B2 | 11/2007 | Tan et al. |
| 2001/0050371 A1 | 12/2001 | Odaki et al. |
| 2002/0003233 A1 | 1/2002 | Mueller-Mach et al. |
| 2002/0008854 A1 | 1/2002 | Leigh Travis |
| 2002/0024495 A1 | 2/2002 | Lippert et al. |
| 2002/0050963 A1 | 5/2002 | Conemac et al. |
| 2002/0122260 A1 | 9/2002 | Okazaki et al. |
| 2002/0124250 A1 | 9/2002 | Proehl et al. |

(56) References Cited

U.S. PATENT DOCUMENTS

| | | | |
|---|---|---|---|
| 2002/0145685 A1 | 10/2002 | Mueller-Mach et al. | |
| 2002/0163702 A1 | 11/2002 | Hori et al. | |
| 2002/0185965 A1 | 12/2002 | Collins et al. | |
| 2003/0094893 A1 | 5/2003 | Ellens et al. | |
| 2003/0184209 A1 | 10/2003 | Russ et al. | |
| 2003/0184531 A1 | 10/2003 | Morikawa et al. | |
| 2003/0184842 A1 | 10/2003 | Morikawa et al. | |
| 2004/0027465 A1 | 2/2004 | Smith et al. | |
| 2004/0070551 A1 | 4/2004 | Walck et al. | |
| 2004/0145312 A1 | 7/2004 | Ouderkirk et al. | |
| 2004/0156079 A1 | 8/2004 | Marshall et al. | |
| 2004/0160516 A1 | 8/2004 | Ford | |
| 2004/0165642 A1 | 8/2004 | Lamont | |
| 2004/0184123 A1 | 9/2004 | Morikawa et al. | |
| 2004/0227465 A1 | 11/2004 | Menkara et al. | |
| 2004/0263074 A1 | 12/2004 | Baroky et al. | |
| 2005/0001225 A1 | 1/2005 | Yoshimura et al. | |
| 2005/0012446 A1 | 1/2005 | Jermann et al. | |
| 2005/0023962 A1 | 2/2005 | Menkara et al. | |
| 2005/0023963 A1 | 2/2005 | Menkara et al. | |
| 2005/0034154 A1 | 2/2005 | Yeh et al. | |
| 2005/0051790 A1 | 3/2005 | Ueda | |
| 2005/0093818 A1 | 5/2005 | Hatam-Tabrizi et al. | |
| 2005/0094266 A1 | 5/2005 | Liu et al. | |
| 2005/0128353 A1 | 6/2005 | Young et al. | |
| 2005/0162566 A1* | 7/2005 | Chuang et al. | 348/795 |
| 2006/0017850 A1* | 1/2006 | Hsieh et al. | 348/564 |
| 2006/0066508 A1 | 3/2006 | Walck et al. | |
| 2006/0081793 A1 | 4/2006 | Nestorovic et al. | |
| 2006/0082873 A1 | 4/2006 | Allen et al. | |
| 2006/0132021 A1 | 6/2006 | Naberhuis et al. | |
| 2006/0221021 A1 | 10/2006 | Hajjar et al. | |
| 2006/0227087 A1 | 10/2006 | Hajjar et al. | |
| 2006/0262243 A1 | 11/2006 | Lester et al. | |
| 2007/0014318 A1 | 1/2007 | Hajjar et al. | |
| 2007/0183466 A1* | 8/2007 | Son | H04N 9/3129 372/24 |
| 2007/0187580 A1 | 8/2007 | Kykta et al. | |
| 2007/0187616 A1 | 8/2007 | Burroughs et al. | |
| 2007/0188417 A1 | 8/2007 | Hajjar et al. | |
| 2007/0206258 A1 | 9/2007 | Malyak et al. | |
| 2007/0228927 A1 | 10/2007 | Kindler et al. | |
| 2007/0258010 A1* | 11/2007 | Hong et al. | 348/564 |
| 2007/0273662 A1* | 11/2007 | Lian et al. | 345/173 |
| 2008/0018558 A1 | 1/2008 | Kykta et al. | |
| 2008/0066107 A1 | 3/2008 | Moonka et al. | |
| 2008/0068295 A1 | 3/2008 | Hajjar | |
| 2008/0123033 A1* | 5/2008 | Grip et al. | 349/114 |
| 2008/0247020 A1 | 10/2008 | Malyak et al. | |
| 2009/0007177 A1* | 1/2009 | Islam | 725/39 |
| 2009/0042619 A1* | 2/2009 | Pierce et al. | 455/566 |
| 2010/0066655 A1* | 3/2010 | Uh et al. | 345/87 |

FOREIGN PATENT DOCUMENTS

| | | |
|---|---|---|
| EP | 0271650 | 6/1988 |
| EP | 1150361 | 10/2001 |
| EP | 1650729 A2 | 4/2006 |
| JP | 56164826 | 12/1981 |
| JP | 2-199975 | 8/1990 |
| JP | 5232583 | 9/1993 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/33970 | 4/2002 |
| WO | WO 02/057838 | 7/2002 |
| WO | WO 2005/119797 | 12/2005 |
| WO | WO 2006/097876 | 9/2006 |
| WO | WO 2006/107720 | 10/2006 |
| WO | WO-2007/034370 A2 | 3/2007 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

(56) References Cited

OTHER PUBLICATIONS

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454:68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1 -in. CRTs", 1997 SID International Symposium Digest of Technical Papers ( SID '97 Digest), vol. XVIII, pp. 440-443 (May 1997).

\* cited by examiner

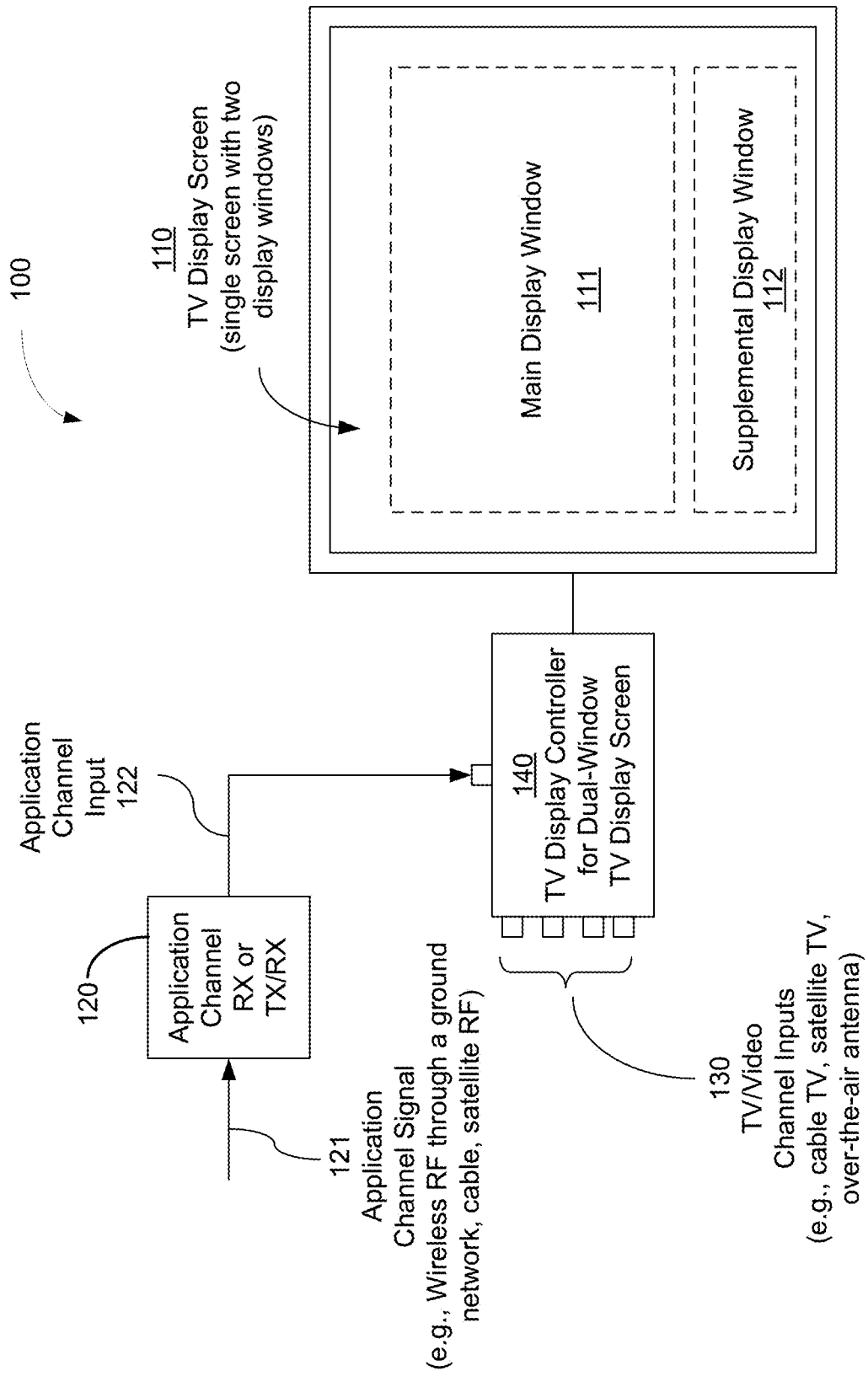

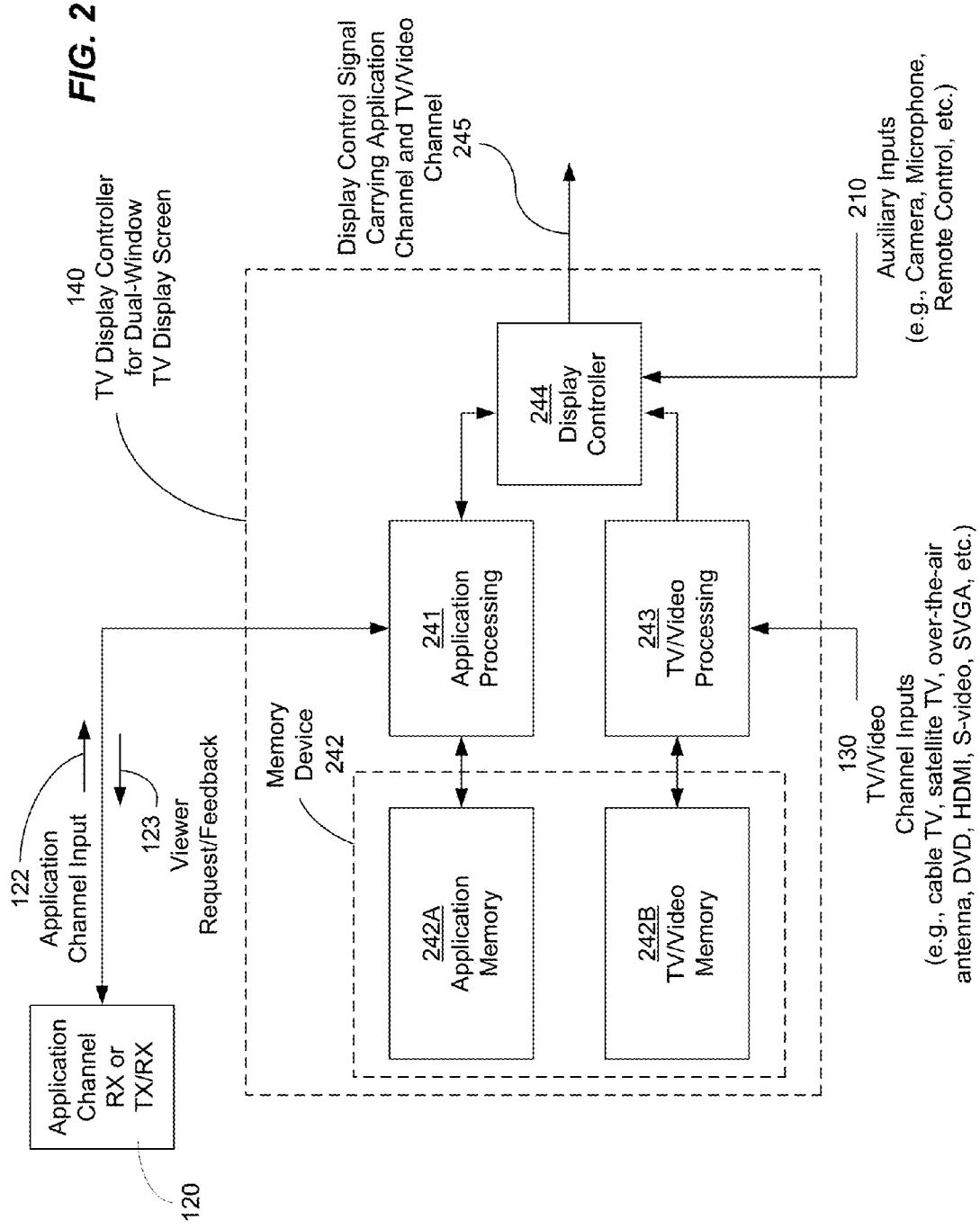

*Application Display Mode*

*Normal Display Mode*

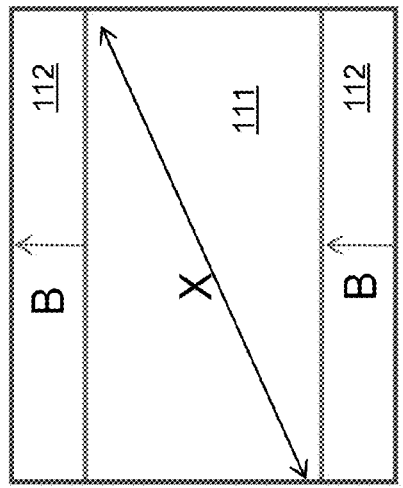
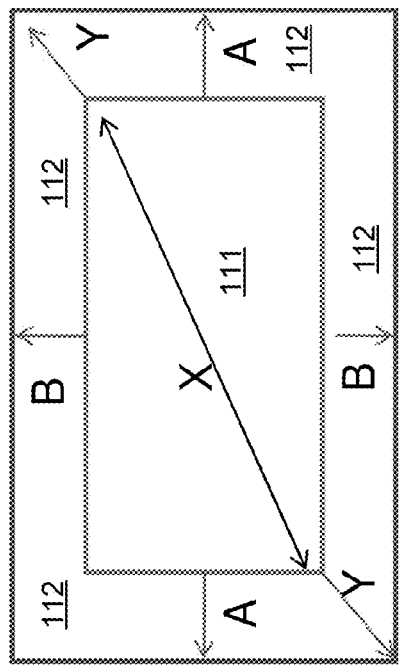
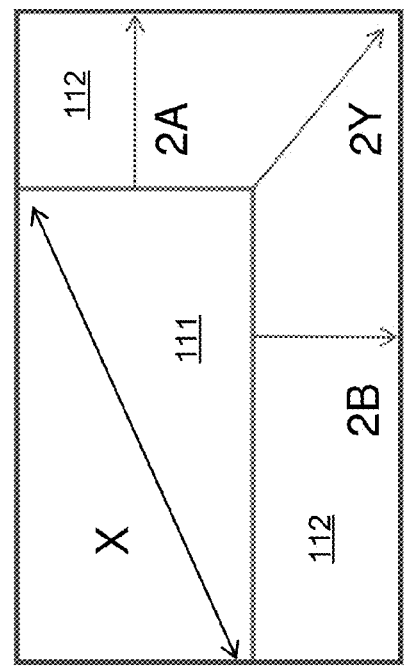
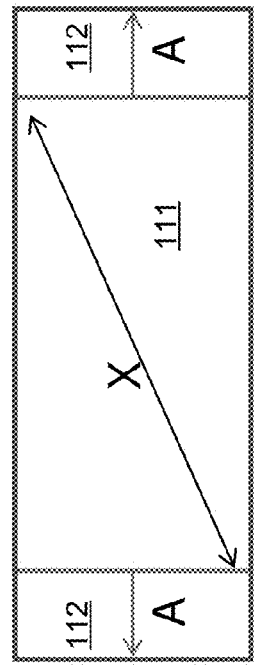

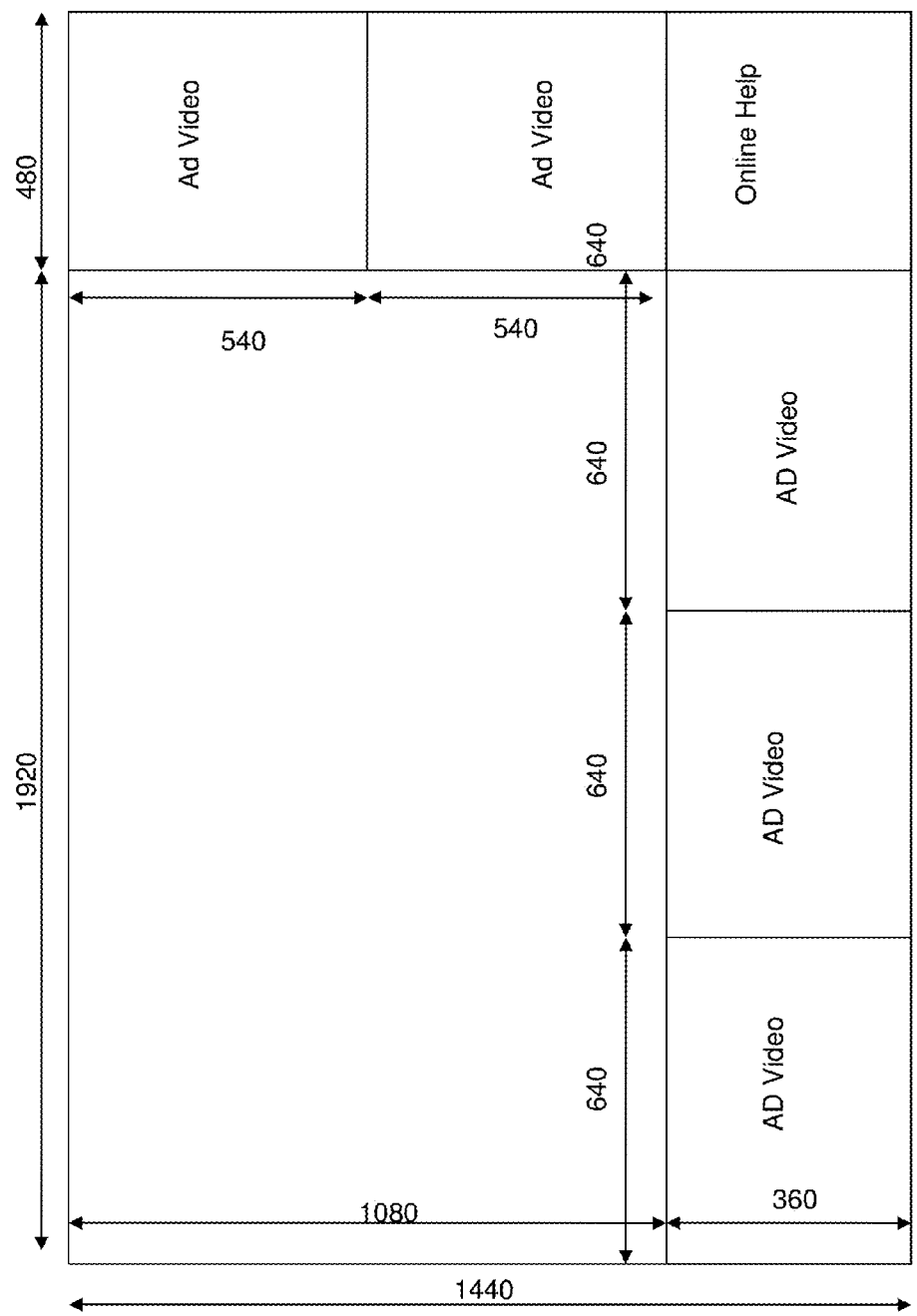

FIG. 8
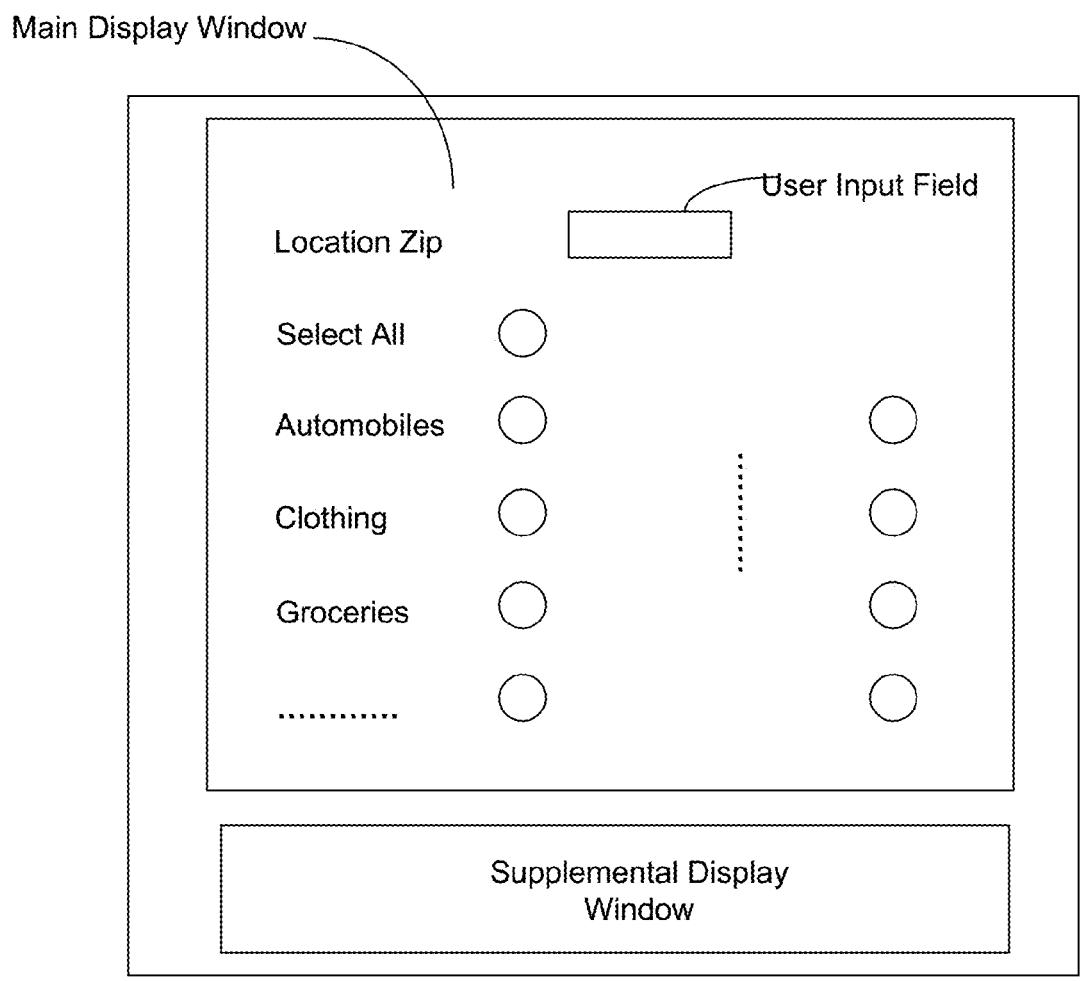
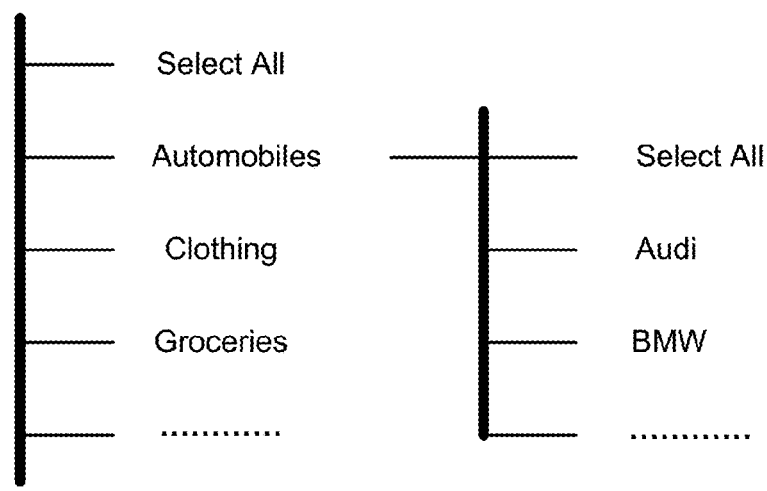

DELIVERING AND DISPLAYING ADVERTISEMENT OR OTHER APPLICATION DATA TO DISPLAY SYSTEMS

PRIORITY CLAIM AND RELATED PATENT APPLICATION

This application claims the benefit of U.S. Provisional Application No. 60/895,966 entitled "Delivering and Displaying Advertisement or Other Application Data to Display Systems" and filed on Mar. 20, 2007, which is incorporated by reference as part of the specification of this application.

BACKGROUND

This application relates to display devices and systems including television sets, and systems, apparatus and methods for delivering information and providing services through display devices and systems.

Display devices and systems include at least one display screen to display still and moving images and can be configured in a wide range of configurations based on different display technologies. Some examples of display devices and systems include, among others, television (TV) sets, desktop and mobile computers, mobile digital devices such as some mobile phones and personal digital assistant (PDA) devices, and indoor and outdoor large displays such as large format displays and digital billboards installed at New York City's Times Square and other locations.

Display devices and systems can be configured to receive information to be displayed through one or more sources. TV sets, for example, can receive TV programming through one or more designated TV signal channels, e.g., (1) a TV broadcast radio signal over the air from a TV station, (2) a TV cable from a TV cable service network, (3) a satellite TV broadcast signal from a TV broadcast satellite, and (4) TV broadcast data from a computer networks such as the Internet. A TV programming provider, such as a cable TV service provider or a satellite TV service provider, can provide many different channels of TV programming to a subscriber's TV set.

SUMMARY

This application describes, among others, display devices and systems including television sets, and systems, apparatus and methods for delivering information and providing services through display devices and systems.

In one aspect, a method for delivering information to a display is described to include establishing a communication link with a display, which receives one or more TV programming channels and an independent designated application channel and includes at least a first display window and a second display window separated from each other without spatial overlap on the screen, to send data of the independent designated application channel to the display. The communication link is separate from one or more communication links that deliver the one or more TV programming channels to the display. This method also includes delivering information over the designated application channel to the display to display in the first display window while simultaneously displaying a TV programming channel on the second display window.

In another aspect, a method for delivering information to a display is described to include providing a display capable of receiving one or more TV programming channels and an independent designated application channel and having at least a first display window and a second display window separated from each other without spatial overlap on the screen; and delivering information over the designated application channel to the display to be displayed on the first display window while simultaneously displaying one of the TV programming channels on the second display window. This method may include providing a viewer control mechanism to allow the viewer to switch the information received from the designated application channel from the first display window to the second display window and switch back at the viewer's choice.

In another aspect, a display system is described to include a screen to display images; at least one TV and video input to receive a TV or video input channel for display on the screen; a designated application channel receiver to receive a designated application channel that is independent from a broadcast TV programming channel; a local memory that stores data received in the designated application channel; and a display controller to control each frame displayed on the screen to have a first display window at a first location on the screen that displays the TV or video input channel and a second window at a second location without overlap with the first display window that displays the stored data in the designated application channel. The display controller includes a switch mechanism to switch displayed contents between the first and the second display windows.

In another aspect, a system is described to include a communication network to provide communications to devices in communication with the communication network; a designated application channel computer server in communication with the communication network to send out data of a designated application channel that is independent from a broadcast TV programming channel; and a display system. The display system includes a designated application channel receiver in communication with the communication network to receive the data of the designated application channel, a local memory to store the received data, a screen to display images, a display controller to retrieve the stored data from the local memory and to display the retrieved data on the screen, and a TV programming receiver to receive the broadcast TV programming channel. The display controller operates to control each frame displayed on the screen to simultaneously display the stored data in the designated application channel and the broadcast TV programming channel on the screen.

In yet another aspect, a method for sending TV advertisements to TV viewers is described to include delivering a designated application channel, that is separated from TV programming channels, through a communication network to networked displays equipped to receive the designated application channel and TV programming channels. This method also includes using one or more computer servers in communication with the communication network to supply selected TV advertisements over the designated application channel without TV programming to each of the networked displays based on viewer profile information of one or more TV viewers associated with the respective networked display.

These and other aspects and implementations can be used to achieve one or more advantages. For example, the designated application channel and associated display features can be provided to advertisers or other information or service providers to directly access TV viewers without using TV programming providers. For another example, the designated application channel and associated display features can be used to provide targeted delivery of information and services to a viewer based on the viewer profile and may be used to allow for interactions with the viewer to provide information and services on demand. For yet another example, the designated application channel and associated display features can be used to provide new or alternative services to TV viewers that may not be available from TV programming providers.

These and other aspects and implementations and associated advantages are described in greater detail in the drawings, the detailed description and claims.

BRIEF DESCRIPTION OF DRAWINGS

FIG. 1 illustrates an example of a display device (e.g., a TV set) that has two or more display windows on the screen and is designed to receive the designated application channel.

FIG. 2 shows an example of the TV display controller in FIG. 1.

FIGS. 4A, 4B, 4C, 4D, 4E and 4F show examples of screen partitions of a screen in FIG. 1.

FIG. 8 shows an example of a graphic user interface for the designated application channel.

DETAILED DESCRIPTION

Figure 1A:
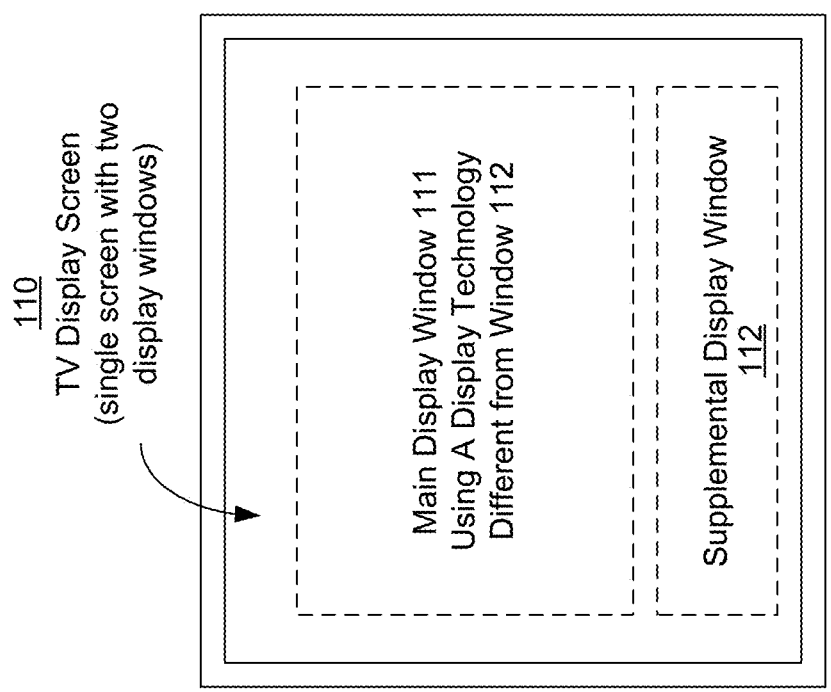
FIG. 1A shows an example of a display screen that implements the main display window by using a display technology that is different from the display technology of the supplemental display window.

In many TV programming channels, the delivered content of a TV programming channel is often controlled by the TV programming provider for that particular channel. For example, the programming provider for a sports channel often exclusively controls all the content in the sports channel, including sports programs, news and commercials. The TV viewer who receives or subscribes the sports channel usually has no control over the programming content in the sports channel and the programming content and the commercials interleaved with programming content are pre-packaged by the programming provider and are sent to all subscribed viewers for the sports channel. For some programming channels such as interactive channels or video-on-demand channels, the TV viewer may select a portion of the content controlled by the TV programming provider but the content of the channel often remains under the sole control of the TV programming provider.

Examples described below provide display devices and systems such as TV sets that allow for receiving a designated application channel that is independent of a TV programming channel and has a display screen that displays both the designated application channel and the TV programming channel selected by the viewer in two or more separate display windows on the screen.

In one implementation, the hardware and software are implemented in the present display devices and systems to allow reception of the designated application channel from a source that is separate from a source for a TV programming channel. For example, a TV programming channel may come from a cable or satellite TV channel while the designated application channel is provided by a designated application channel computer server in communication with the Internet, a wireless communication network (a cellular network based on GSM, CDMA, WiMax, WiFi or other wireless communication standards) or other communication networks. For another example, both a TV programming channel and the designated application channel may some from the Internet but the designated application channel computer server is separated from and is independent of a computer server on the Internet that provides the TV programming channel. The designated application channel computer server can be directly connected to the communication network that delivers the designated application channel to the viewer's TV set or is connected to a separate network (e.g., an IP communication network) that is connected to the communication network that delivers the designated application channel to a viewer's TV set. The designated application channel can be used to provide various information and services to the TV set for the viewer, e.g., advertisements, alternative TV programming, video conference service, telephone calls, access to various databases or the Internet, access to controlling of on-line appliances, on-line banking, on-line shopping, and others. This designated application channel is independent from a TV programming channel and can make the TV viewer be accessible by other information providers and service providers through the designated application channel computer server.

Such a system based on the designated application channel and display devices and systems capable of receiving the designated application channel and displaying two or more separate windows on a screen can be used to create new uses and applications of TV sets and other display systems, including individualized TV advertising and other individualized application services. In some implementations, a TV viewer can use the TV set to access the designated application channel computer server to provide or update user profile data, to request for or change individualized services such as certain selected advertisements, or to access an application such as conducting a telephone call or video call, controlling an Internet-connected appliance, or accessing an Internet website.

FIG. 1 illustrates an example of a display device 100 (e.g., a TV set) that has two or more display windows on the screen and is designed to receive the designated application channel in addition to receiving one or more TV programming channels. The display technology for the device 100 may be based on various display technologies. Examples of some flat panel display technologies include plasma flat panel displays, LCD flat panel displays, field emission display (FED) flat panels and organic light emitting diode (OLED) display panels. Examples of some front and rear projector displays include CRT projectors, LCD projectors, digital light processing (DLP) projectors, digital direct drive image light amplifier (D-ILA) projectors, liquid crystal on silicon (LCOS) projectors and scanning beam fluorescent or phosphorescence displays.

In FIG. 1, the TV set 100 includes a TV display screen 110 to display images. The TV display screen 110 can be a single screen that includes a large main display window 111 and one or more separate small supplemental display windows 112. The example in FIG. 1 shows one small supplemental display window 112 on the lower part of the screen 110. In some implementations, the main display window 111 and the supplemental display window 112 can be spatially separated display windows without overlap with each other. Therefore, different from overlapped pop-up windows commonly seen on computer desktops and picture-in-picture features in TV sets, the content display in each window in such implementations is free of obstruction by the other display window.

The main display window 222 can be a HDTV display window with an aspect ratio of 16:9 that supports a desired HDTV resolution, such as 720 line progressive scan (720 p), 1080 interlaced scan (1080 i), 1080 progressive scan (1080 p) or other HDTV resolution formats. The supplemental display window 112 can be smaller in size and can be configured to have the same image pixel size as the main display window 111 when both display windows are generated on the same screen using the same display technology, e.g., a LCD display, a plasma display, a projection display or a scanning-beam display. Alternatively, the supplemental display window 112 may be configured to have a different pixel size from the main display window by using either the same display technology as the main display window 111 or a different display technology. For example, a lower resolution slower response low cost technology may be used for ad-specific applications in the supplemental display window 112. FIG. 1A illustrates a display screen that implements the main display window 111 by using a display technology that is different from the display technology of the supplemental display window 112.

The TV set 100 in FIG. 1 includes a TV display controller 140 for the dual-window screen that processes the designated application channel input 122 and a TV/video channel input 130 and to display the two channels on the two display windows 111 and 112, respectively. A user remote control unit can be used by the TV viewer to switch either of the designated application channel 122 and the TV/video channel 130 onto the main display window 111. An application channel receiver (RX) or transceiver (RX/TX) 120 is provided to receive a designated application channel signal 121 from a source outside the TV set and to output a designated application channel input signal 122 to the TV display controller 140. The application channel receiver or transceiver 120 can be designed to receive the designated application channel signal 121 in one or more formats, such as a wireless RF signal from a ground RF communication network (e.g., a cellular network), a cable communication network, a WiFi communication channel or network under IEEE 802.11, a WiMax communication network, a digital subscriber line (DSL) over a telephone network, and an RF communication signal from a satellite.

FIG. 2 shows an example of the TV display controller 140 in FIG. 1. The controller 140 includes a memory device 241 that stores data from the application channel input and the TV/video channel. The memory device 241 may be two separate memory devices 242A and 242B to separately store TV/video data and the application channel data. The data in the received application channel input 122 is received and processed by an application processing unit 241 and is then stored in the memory 242 (e.g., the application channel memory 242A). The application processing unit 241 is provided and configured to process the application channel data for display on the screen. The TV/video channel input 130 selected by the viewer is sent to a TV/video processing unit 243 for processing and the processed data is used for display on the screen. A TV/Video memory device 242B can be provided to store the processed TV/Video data for later retrieval for display on the screen. A display controller 244 is provided to combine the processed application channel data and the TV/video channel data to produce a display control signal 245 that controls the screen to display the two channels in the two different windows. In some implementations, at least two of the application channel processing unit 241, the TV/video processing unit 243 and the display controller 244 may be integrated as a single chip. For example, all three functions may be integrated into a single controller.

In one implementation, the display controller 244 uses the data from the designated application channel and the data from a viewer-selected TV programming channel to form the frame data for each frame to be displayed on the screen. A rater scanning mechanism can be used to render the images on the screen. In such a raster scan in scanning through horizontal lines from the top of the screen to the bottom of the screen in displaying one frame, the contents in the two display windows can be embedded in the pixel data for each frame and are sent to the screen during the scans in a frame. At the end of one frame scan and prior to the next frame scan, the display controller performs a vertical retrace in a period known as the vertical blanking interval, the display controller does not send out data from the designated application channel and the data from a viewer-selected TV programming channel. At the end of the vertical blanking interval, the display controller resumes sending out the data from the designated application channel and the data from a viewer-selected TV programming channel in the next frame scan.

Figure 3B:
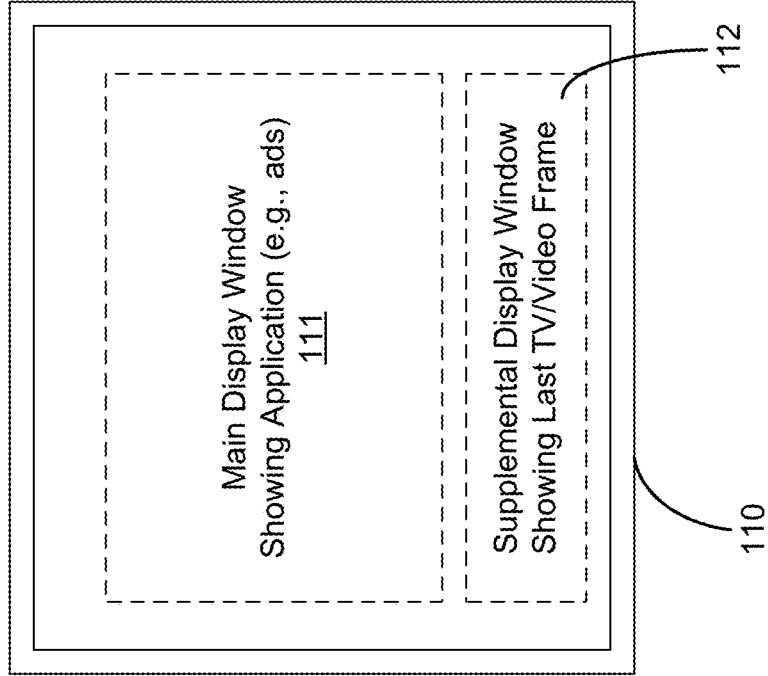
FIGS. 3A and 3B show two display modes of a screen in FIG. 1.
Figure 3A:
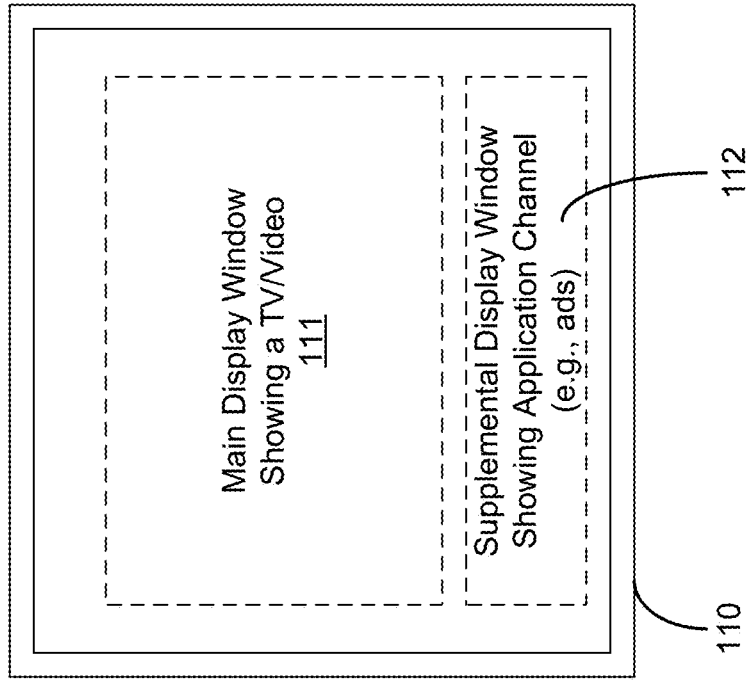

In operation, the TV viewer can select either of the application channel and the TV/video channel to be shown in the main display window 111. Referring to FIG. 3A, in a "normal" display mode, the viewer can select the main display window 111 to show the TV/video channel while displaying the application channel in the supplemental display window 112. The application channel may be displayed in the supplemental display window 112 in a reduced version, e.g., text of a commercial without the full images or video or sound in the commercial. When the viewer switches the application channel to be displayed in the main display window 111, the full version of the content of the application channel is displayed, e.g., a commercial with sounds and video or images. Hence, under the normal display mode, the TV/video channel data can be sent directly to the TV/video processing without being stored in the memory. Alternatively, the TV/video channel data can be sent directly to the TV/video processing for display while being simultaneously stored in the memory in a circular storage mode to overwrite the oldest data when the storage is full. When the viewer sees a commercial of a particular interest, the viewer can use the TV remote control unit to switch the application channel to the main display window 111. This is the application display mode as shown in FIG. 3B. Upon switching, the received data stream of the TV/video channel is stored in the memory and the TV/video processing unit generates a flag to indicate the location of the video stream where the switching occurs. When the viewer switches the TV/video channel back to the main display window 111, the TV/video processing unit retrieves the stored TV/video data from the memory and begins to display from the location of the video stream marked by the flag.

In some implementations, the display controller 244 can be configured to allow a viewer to send requests or feedback 123 via an viewer interface menu on the screen by using, e.g., the viewer remote control. The data for the viewer request or feedback 123 is sent by the application processing unit 241 to the application channel transceiver 120 which further transmits the viewer data to a remote application computer server that supplies the application channel input 122. The remote application computer server can be connected to a communication network through which the data is delivered between the TV and the remote application computer server.

The partition of the screen into at least two display windows shown in FIGS. 1, 3A and 3B is one of various partition configurations. FIGS. 4A-4D show four other screen partition examples where X represents the main display window 111. In FIG. 4A, the main display window 111 is at the center of the screen while the supplemental windows 112 are at peripheral areas A and B at four sides of the screen. In FIG. 4B, the main display window 111 is at the center of the screen fully occupying the screen along the horizontal direction while the supplemental windows 112 are at peripheral areas B at upper and lower sides of the screen. In FIG. 4C, the main display window 111 is at the center of the screen fully occupying the screen along the vertical direction while the supplemental windows 112 are at peripheral areas A at left and right sides of the screen. In FIG. 4D, the main display window 111 is off the center of the screen while the supplemental window is 112 at peripheral areas at two adjacent sides of the screen.

Figure 4E:
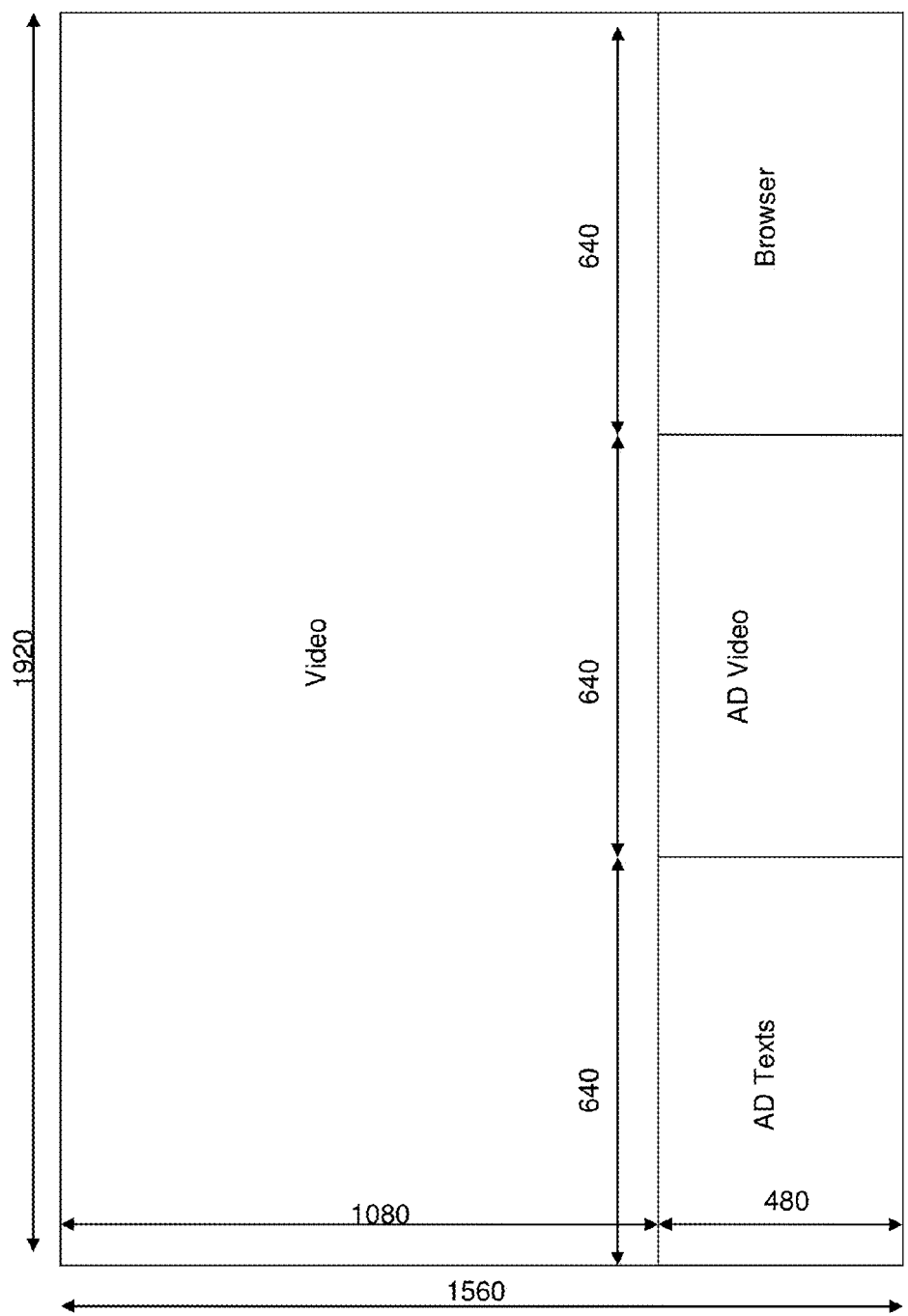

FIG. 4E shows a screen partition example where a 1920 V×1560 H screen is partitioned into a 1920 V×1080 H main display window and three 640 V×480 H supplemental display windows on the bottom of the screen. The supplemental display windows are used for simultaneously showing advertisements in text, advertisements in video and a browser interface.

FIG. 4F shows a screen partition example where a screen with 2400 vertical lines and 1440 horizontal lines is divided in to a 1920 V×1080 H main display window and multiple supplemental display windows. The multiple supplemental display windows include two 480 V×540 H windows vertically stacked on the right-hand side of the main display window, three 640 V×360 H supplemental display windows horizontally lined up below the main display window and a 480 V×360 H supplemental window at the right lower corner of the main display window. These supplemental windows are used for simultaneously showing different TV advertisements and an online help interface.

In some applications, the TV set in FIG. 1 may include a video camera (e.g., a web cam) located at one side of on the screen and may provide a microphone on the TV set, the user remote control or the video camera for video conference applications and other applications that deliver images from the TV set to a remote destination through the designated application channel. For example, such applications can be provided to customers who wish to buy time on the designated application channel.

Figure 5A:
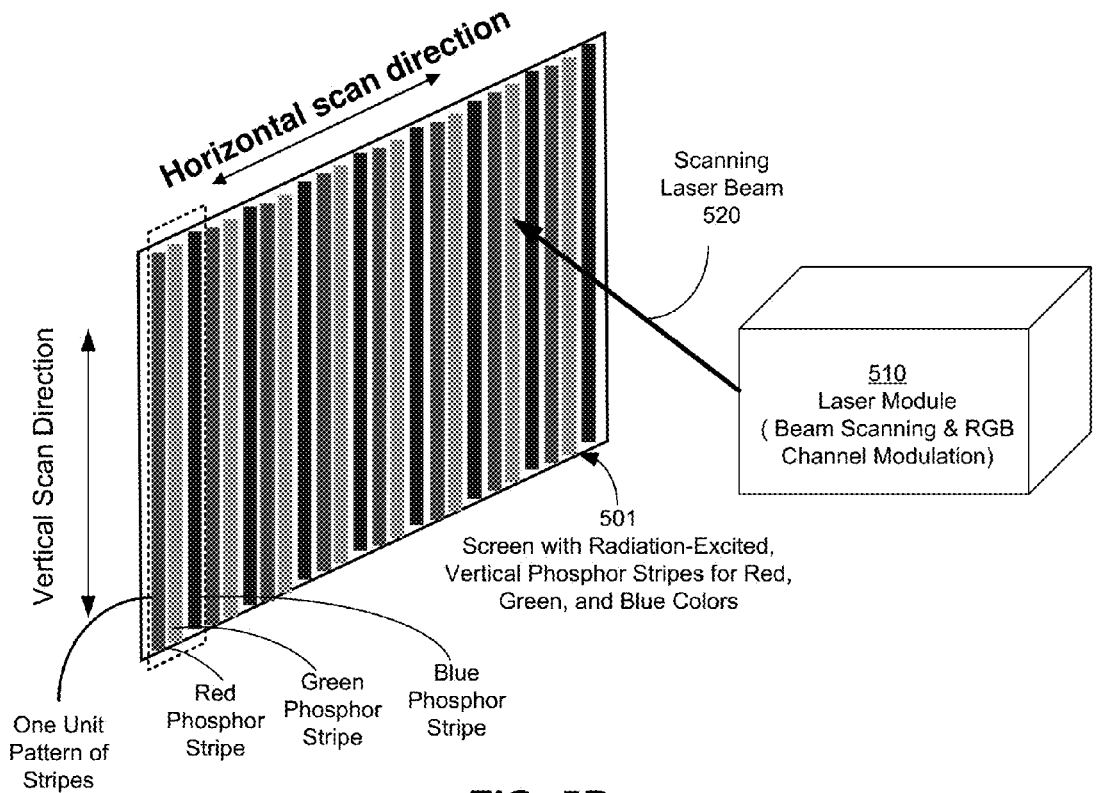
FIGS. 5A and 5B illustrate one example of display devices for FIG. 1.
Figure 5B:
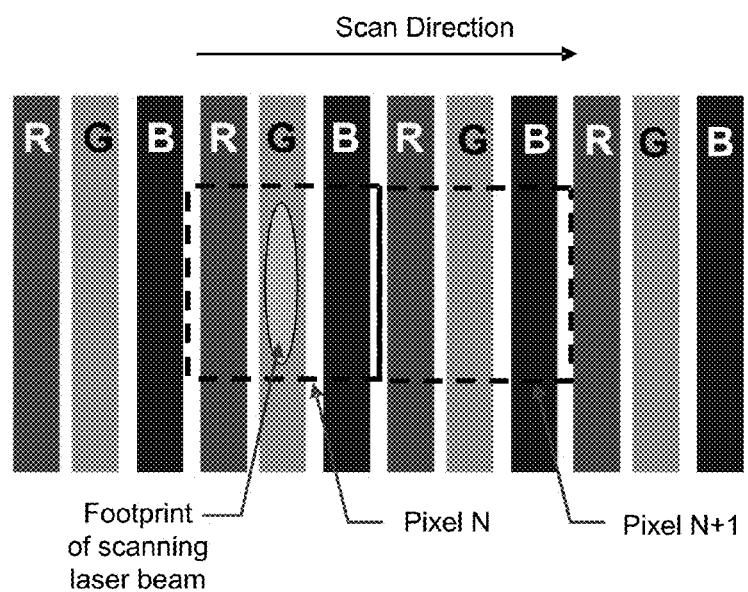

FIGS. 5A and 5B show an example of a scanning-beam fluorescent screen for implementing the TV sets shown in FIGS. 1-4D. At least one scanning laser beam 520 is used to excite color light-emitting materials deposited on a screen 501 to produce color images. The scanning laser beam 520 is modulated to carry images in red, green and blue colors or in other visible colors and is controlled in such a way that the laser beam excites the color light-emitting materials in red, green and blue colors with images in red, green and blue colors, respectively. Hence, the scanning laser beam 520 carries the images but does not directly produce the visible light seen by a viewer. Instead, the color light-emitting fluorescent materials on the screen 501 absorb the energy of the scanning laser beam and emit visible light in red, green and blue or other colors to generate actual color images seen by the viewer.

FIG. 5A illustrates an example of a laser-based display system using a screen having color phosphor stripes. Alternatively, color phosphor dots may also be used to define the image pixels on the screen. The system includes a laser module 510 to produce and project at least one scanning laser beam 520 onto a screen 501. The screen 501 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 520 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 510 can include one or more lasers such as UV diode lasers to produce the beam 520, a beam scanning mechanism to scan the beam 520 horizontally and vertically to render one image frame at a time on the screen 501, and a signal modulation mechanism to modulate the beam 520 to carry the information for image channels for red, green and blue colors. Such display systems may be configured as rear scanner systems where the viewer and the laser module 510 are on the opposite sides of the screen 501. Alternatively, such display systems may be configured as front scanner systems where the viewer and laser module 510 are on the same side of the screen 501.

FIG. 5B further shows the operation of the screen 101 in a view along the direction perpendicular to the surface of the screen 501. Since each color stripe is longitudinal in shape, the cross section of the beam 520 may be shaped to be elongated along the direction of the stripe to maximize the fill factor of the beam within each color stripe for a pixel. This may be achieved by using a beam shaping optical element in the laser module 510.

The laser module 510 may use a vertical scanning mirror and a rotating polygon mirror to provide the 2-dimensional scanning of one or more scanning beams on the screen to form images. A beam may be first directed to the vertical scanning mirror and then to the horizontal polygon mirror or in a reverse order. In operation, in tracing a horizontal line by scanning the polygon scanner, the vertical scanning mirror operates to displace the horizontal lines vertically. The vertical scanning mirror can be implemented by, e.g., using a mirror engaged to a galvanometer as the vertical scanner.

The above scanning-beam display design can be used to achieve large displays (e.g., 60" or above) with high resolutions (e.g., 1080 p HDTV resolution) at relatively low costs. For example, a large fluorescent screen can be built with extra space around the standard feature size (HD 1080 p today) where the extra space can be used to provide for the supplemental display window on any side of the screen. The fluorescent screen can be designed to be efficient in generating colored light under optical excitation of the scanning beam. Therefore, such scanning type displays, when properly designed and engineered, can have low power consumption and a long lifetime. As the result, the application channel can be in an "always on" mode.

Notably, the application channel is separated from TV programming channels received from cable, satellite or other sources in the above TV sets and hence can be used by a party other than the TV programming providers or Internet service providers to have access to TV viewers. The TV sets with one or more supplemental display windows can be designed to deliver the content in the designed application channel to one or more supplemental display window while showing a viewer selected TV program in the main display window. The control of the TV set allows a viewer to switch the content of the designed application channel to the main display window as the viewer desires. The designated application channel can be a passive advertisement channel to deliver various TV advertisements to the viewer in some implementations. Alternatively, the designated application channel can be "interactive" to allow the viewer to access a website featuring the product or service advertised in the TV ads through the designated application channel so that the viewer can obtain additional information on that advertised product or service and other products and services offered on the website and may use the TV remote control and on-screen user interface menu to make a purchase on the website.

One application for the designated application channel is a TV advertisement system that is independent of TV programming channels subscribed by the TV viewers and a ISP from which the view obtains high-speed Internet access. Information of the viewers may be obtained during sale of the TV sets and such viewer information can be used to tailor the information content in the designed application channel to fit certain criteria of the viewer profile. For example, the TV advertisements delivered via the designated application channel may be made contextual to the viewer profile to provide targeted or personalized TV ads.

Many other applications can also be implemented through the designated application channel. For example, video conference services may be provided, where a viewer uses an on-screen video conference call application delivered through the designated application channel to the TV set and a video camera on the TV set to conduct video conference calls. For another example, a telephone call service may also be provided through this system.

The content of the designated application channel can be minimized or simplified when displayed in the small supplemental display window of the TV screen. This is to reduce distractions when the main display window is playing a TV program from one of the TV channels. For example, the content of the designated application channel in the supplemental display window may be displayed as a text or a small logo and may also be changed less frequently over time such as displaying one image or text no more than once a minute.

In some implementations, the supplemental display window can be used to allow the user to display another channel using the supplemental display as "picture in picture" with overlay of advertisement. This feature can be used to entice the user to use the extra display space to select channels. In this hardware implementation, the extra display is connected to the incoming TV channel while mixing it with advertisement space on the side.

In some implementations, a cellular network may be used to deliver the designated application channel to the TV set in FIG. 1 where the application channel receiver or transceiver is a wireless subscriber station in the cellular network. To efficiently use the limited cellular bandwidth, the content of the designated application channel may be downloaded and stored in the application memory unit during a period where there is less traffic (e.g., late night or early morning). The stored data can be later retrieved from the memory and displayed the screen when the TV is turned on. Other communication networks may be used to deliver the designated application channel such as the Internet, a WiMax communication network, or a WiFi network. On the Internet, various technologies for distribution of multimedia data including video may be used to deliver the designated application channel, including data distribution technologies provided by Ortiva Wireless (http://www.ortivawireless.com) and Akamai Technologies, Inc (http://www.akamai.com).

Figure 6:
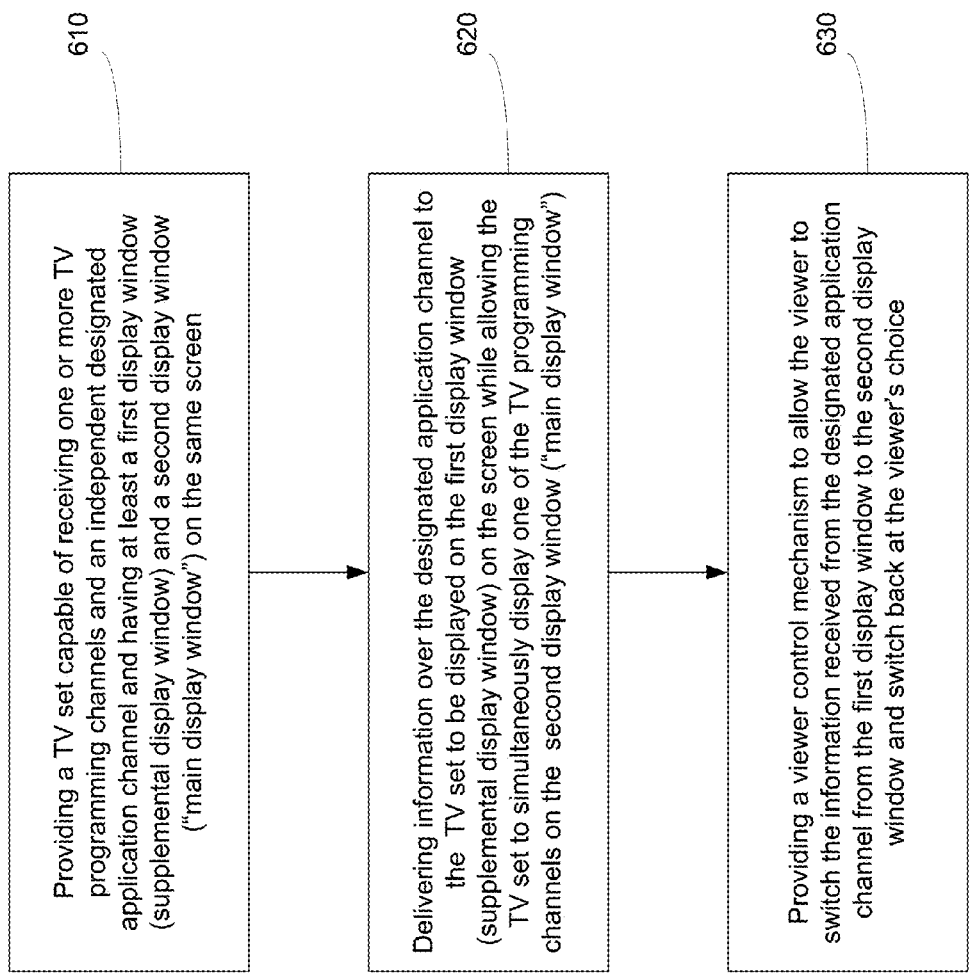
FIG. 6 illustrates how the TV set in FIG. 1 is operated to deliver content to TV viewers.

FIG. 6 illustrates an example for using the TV set in FIG. 1 to deliver content to TV viewers. A TV set which is capable of receiving one or more TV programming channels and an independent designated application channel and having at least a first display window (supplemental display window) and a second display window ("main display window") on the same screen is provided (step 610). The hardware described in FIGS. 1 and 2 is included in this TV set. Information that is separated from TV programming is delivered over the designated application channel to the TV set to be displayed on the first display window, the supplemental display window, on the screen while allowing the TV set to simultaneously display one of the TV programming channels on the second display window, the main display window (step 620). In one implementations, a viewer control mechanism such as a TV remote control and related control circuitry in the TV can be provided to allow the viewer to switch the information received from the designated application channel from the first display window to the second display window and switch back at the viewer's choice (step 630).

Figure 7:
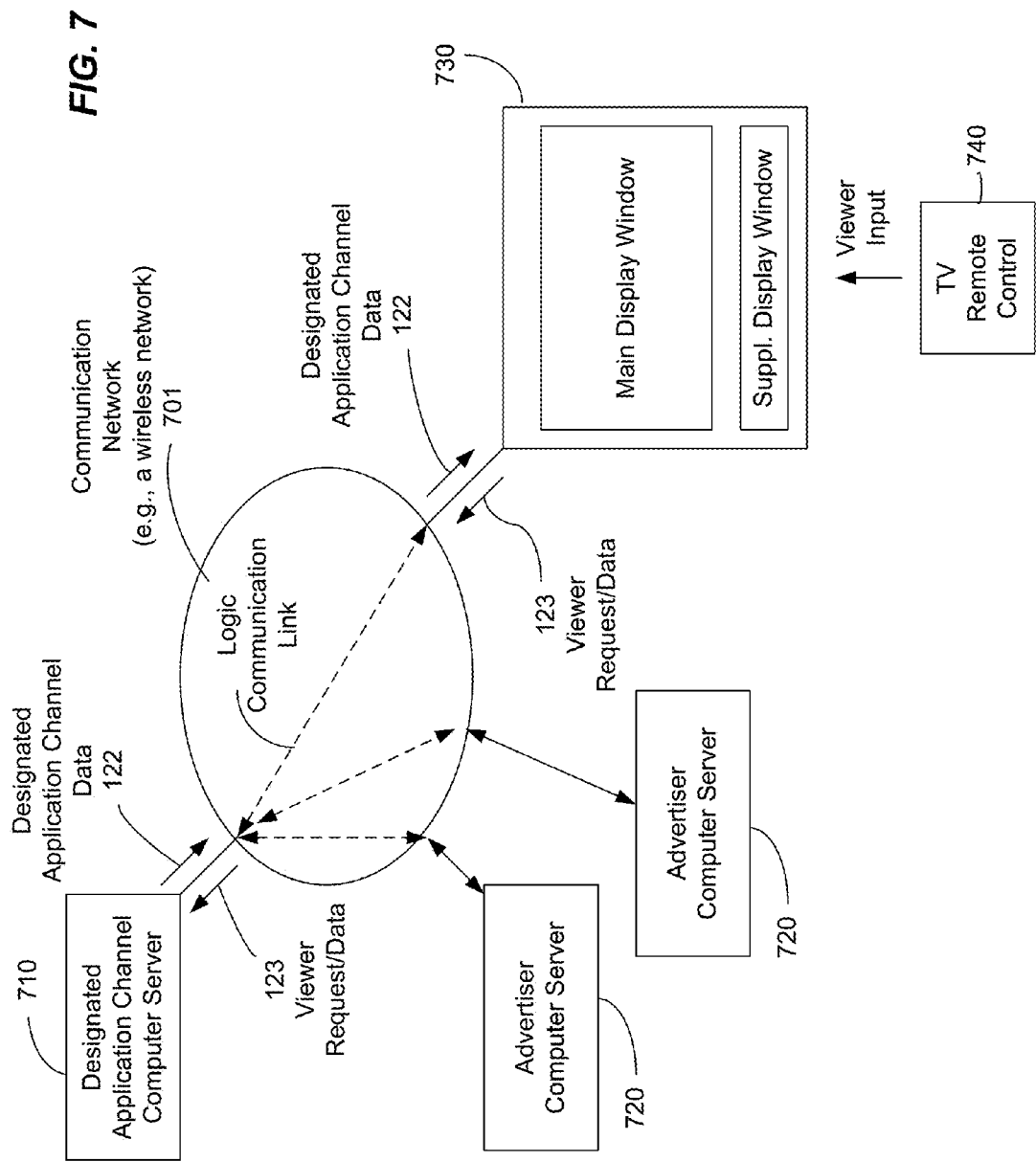
FIG. 7 illustrates one example of a system level implementation for providing the viewer feedback through a communication network to which the designated application channel computer server is either directly connected or indirectly connected through another communication network.

The designated application channel can be configured to allow a TV viewer to provide viewer feedback through a user graphic interface to the designated application channel computer server to send viewer requests and data and to access other resources through the designated application channel computer server. FIG. 7 illustrates one example of a system level implementation for providing the viewer feedback through a communication network to which the designated application channel computer server is either directly connected or indirectly connected through another communication network.

In FIG. 7, the designated application channel computer server can be implemented by one or more computer servers 710. The communication network 701 can be one or more connected communication networks. A wireless communication network, e.g., a wireless cellular network, can be used to implement the network 701. An advertiser can use an advertiser computer server 720 in communication with the network 701 to deliver its advertisements to the designated application channel computer server 710 and such advertisements are stored in the server 710. Multiple advertisers can send and store their advertisements in the server 710. The server 710 can selectively request advertisements from advertisers via their servers 720 based on the viewer requests or its need to send targeted advertisements to viewers. A user TV set or other display system 730 is connected in communication with the network 701 via the transceiver 120 to send out viewer request or data and to receive the selected advertisements from the server 710 via the network 701.

The designated application channel computer server 710 stores viewer profile data, viewer requested advertisements and selected advertisements that retrieved from advertiser computer servers 720 based on viewer profile data of various viewers. These stored advertisements are sent to respective viewers via the network 701. At the viewer side, each TV set 730 includes a local memory that stores data related to the designed application channel. Referring back to FIG. 2, the application memory 242A is designated to store such data which can include, for example, the local viewer profile data, advertisement data and other data that are received from the designated application channel computer server 710. The application processing module 241 in FIG. 2 is programmed to perform advertisement heuristic methods for delivering advertisements to the TV screen by using the viewer profile to push selected advertisements from the server 710 to the TV screen without the viewer requests or by responding to the user requests to retrieve user requested advertisements from the server 710 for displaying on the TV screen. The local stored advertisement data in the TV set 730 may be formatted in different content types so that each advertisement is available in multiple formats. For example, an advertisement can be stored in a plain text format with a hyperlink for scrollable text mode, a flash animation format to be displayed in the supplemental display window and a high-definition quality video format to be shown in the main display window. Referring to the screen partition in FIG. 4E, the supplemental display windows in that example can be used to show ads in text and ads in flash animation video. A viewer at the 730 can use the TV remote control 740 to call up the user graphic interface on the screen in either of the display windows, e.g., in the main display window and send various requests or viewer data to the designated application channel computer server.

FIG. 8 shows an example of a viewer menu to allow the viewer to use the remote control to send viewer information, e.g., data, preferences or requests, to the remote designated application channel computer server.

For example, a viewer can provide or update viewer data profile stored in the designated application channel computer server. The viewer profile data can be used by the designated application channel computer server to deliver selected advertisements tailored based on the information in the viewer data profile. The viewer data profile may include demographic information of a viewer and interests, hobbies and habits of the viewer. For example, the viewer data profile may include at least some of the following items on the viewer: age, gender, residence, occupation, information on homeownership or rental residence, income level, education, hobbies, family, interests in sports, art, books, music, films, food, wine, and future purchases. This feature can be used to provide targeted advertisements to a group of users with certain demographic characteristics and, notably, to provide individualized advertisements tailored for each individual viewer. Such targeted advertising and individualized advertising can be difficult to achieve in conventional TV programming channels and can open up new and direct advertising opportunities for advertisers. The combination of the designated application channel free of control by a TV programming provider and the display features provided by TV sets with two or more display windows in FIG. 1 provides a direct contact between individual viewers and an advertiser.

The above user profile data can be obtained by requesting the user to provide such data. Referring to FIG. 2, the application processing module 241 can be configured to obtain certain data from the TV/Video processing module 243 to capture the user's history of TV programming viewing preferences and habits. Such captured user's history of TV programming viewing preferences and habits can be used by the application processing module 241, either in combination with the user provided viewer profile data or independent from with the user provided viewer profile data, to request and retrieve certain advertisements from the server 710 and to push such advertisements to the TV screen.

As another example, a viewer can request certain types of advertisements to be delivered through the designated application channel to the viewer's TV set using the viewer feedback or requests to the designated application channel computer server 710. The user graphic interface can be desired to provide fields where the viewer can enter viewer requests for selected advertisements or provide choices of available advertisements for the viewer to select. In response to the viewer's selection, the selected advertisements are delivered to the viewer's TV set from the designated application channel computer server. Therefore, if the viewer wants to see all car advertisements, a viewer selection can be made. The viewer can also change the selection or specify the period for the selection.

The designated application channel can also be used as a link for a viewer to access the Internet. The viewer can use the user graphic interface to access the Internet using the TV remote control. For example, this feature can link the viewer to a website selling a product or service through the independent designated application channel when the viewer selects the product or service on the TV set displaying the designated application channel. During this operation, the designated application channel can be displayed in the main display window.

Different from a conventional TV programming channel where the programming content and advertisements are interleaved in different broadcast time slots, the designated application channel described here provides a designated channel that is independent from a TV programming channel and allows advertisers to directly deliver their advertisements to a viewer. This aspect of the present systems provides alternative and direct access to TV viewers with targeted and individualized advertising. Referring to FIG. 7, an advertiser can send advertisements from the advertiser's computer server 720 connected to the communication network 701 to the designated application channel computer server 710 to be stored in a memory. This memory in the designated application channel computer server 710 can be an advertisement depository to store advertisements from different advertisers and are indexed for delivery to viewers. Referring to FIG. 2, the local memory 242 in the TV set stores the received advertisements and the stored advertisements are displayed in one of the two display windows when the TV set is turned on.

Various revenue generation mechanisms can be built in the present systems. For example, an advertiser can be charged a fee for placing one or more TV advertisements from the advertiser in the stored collection of advertisements. For another example, an advertiser can provide and store one or more TV advertisements in the stored collection of advertisements for free but is charged a fee every time one of the advertiser's advertisements is delivered to a TV viewer due to the viewer request or by other mechanisms that trigger the advertisement delivery to a user. For example, an advertisement can be sent to a viewer based on the viewer profile data collected in computer server for delivering the designated application channel. A combination of the above and other methods for charging advertisers may be used in some applications.

Figure 9A:
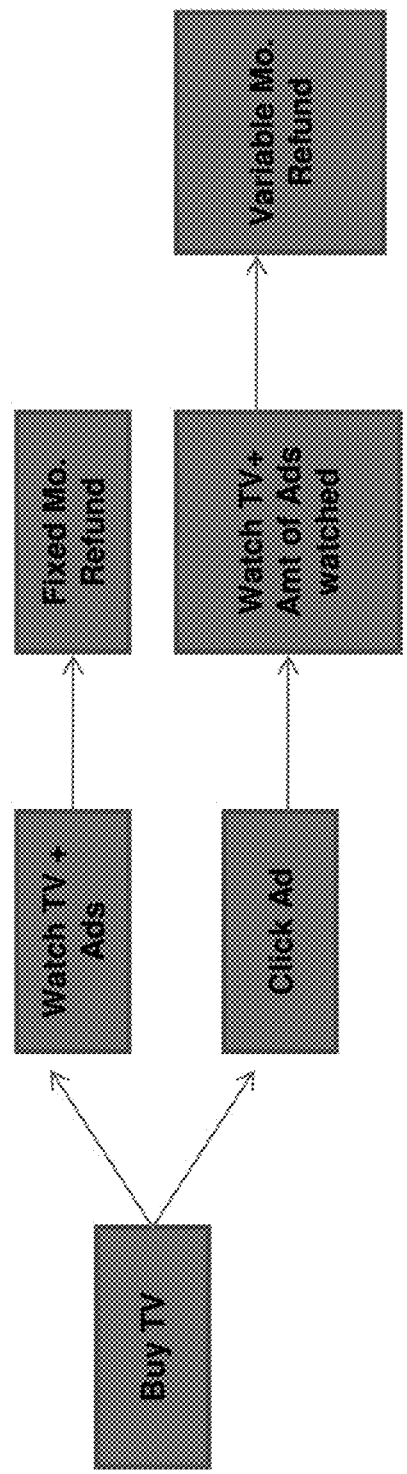
FIGS. 9A and 9B show examples of business models in marketing TV sets in FIG. 1 and associated services through the designated application channel.

The above described TV sets can be sold to viewers with different options for receiving the content in the designated application channel. FIG. 9A illustrates business models where a TV buyer purchases the TV at a retail price and receives refund for agreeing to receiving the content from the designated application channel. In one implementation, the buyer can receive monthly, quarterly or other periodical payment for agreeing to receiving the designated application channel until the full purchase price is paid back to the buyer. In another implementation, the buyer may be given the option of getting only partial refund when the buyer wants to terminate delivery of advertisements earlier. Without displaying the designated application channel, the screen area occupied by the supplemental display window is freed and may be used to provide an extra display area for the main display window (e.g., using the entire screen to show the main display window or allowing the user to zoom the main display window). In yet another implementation, the TV records the number of times that the TV is switched to the application display mode by showing the designated application channel and computes the amount of a periodic payment based on the amount of the time that the TV is in the application display mode. A buyer can also purchase the TV without agreeing to receive any information from the designated application channel. In this case, the supplemental display window can be designed to display the TV manufacture's logo or name.

Figure 9B:
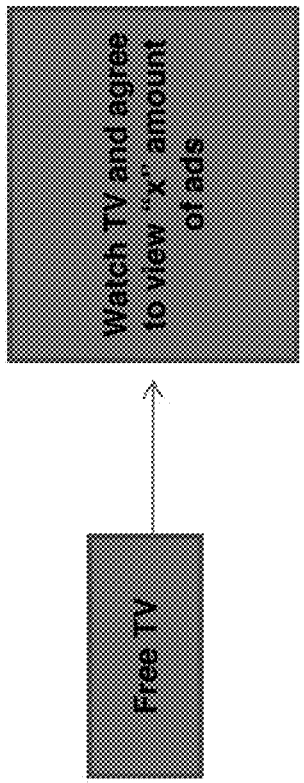

FIG. 9B shows another business model where a TV buyer gets a free TV but agrees to receiving the designated application channel over a minimum amount of time (e.g., 2 years).

The above described video conference and telephone services delivered via the designated application channel are examples of various services that can be delivered through the designated application channel. Various other applications can be achieved based on the designated application channel, including on-line gaming, on-line premise security monitoring, localized on-line yellow page services, and monitoring telephone (including caller ID) services.

For example, the designated application channel can be used to send information on status of a telephone at the user's premise. The telephone, which may be an IP phone or a phone through the public telephone switch network via a telephone line, may be connected to the display unit via a cable or wirelessly. While watching TV, if the phone rings, the caller ID from the phone is delivered to the display controller as part of data to be displaced on the supplemental display window on the screen. In operation, the display controller temporarily halts the display of the information in the designated application channel and displays the caller ID in the supplemental display window. Based on the displayed caller ID, the viewer can decide whether to answer the call. The viewer may use the display equipped with speaker and microphone to take the incoming call via a telephone call user interface menu on the screen and the selection of answering the call can automatically mute the sound of the TV/video channel. The viewer can make an outgoing call using the telephone call user interface menu in the supplemental display window while watching the TV/video channel in mute. A designated button on the viewer remote control may also be used for the viewer to call up the telephone call user interface menu in the supplemental display window on the screen. Upon completing the call, the previously halted information in the designated application channel is resumed and is shown in the supplemental window.

Referring to FIG. 7, the designated application channel computer server 710 may be used to store phonebook-like information in various regions and, based on a viewer's location (e.g., zip code or address) in the user profile data to deliver on phonebook information the district or city of the viewer. The viewer can send a request via the designated application channel to access local information, such as, restaurants, shops, hospitals, movies, and others by using the remote control. In one implementation, a designated icon for the phonebook-like information can be placed in a user interface menu or a selective location in the supplemental display window and the user can use the remote control to select and call up the user interface menu for the phonebook-like information. Alternatively, a designated key on the remote control may be used for the viewer to call up the user interface menu for the phonebook-like information. The user interface menu for the phonebook-like information provides a search screen to allow the viewer to search the phonebook-like information and to make a phone call to a selected telephone number from the search.

For security monitoring applications, information from a security monitoring system (e.g., visual or motion based) at a user's premise can be connected to the display controller and can be delivered to and shown in the supplemental display window via a security monitoring user interface menu. For example, video feed from a security camera can be transmitted to the display controller and be displayed in the supplemental display window on the screen. When the supplemental display window is used to show advertisements or other data from the designated application channel, the security monitoring user interface menu may be called up to display in the supplemental display window by a trigger signal (e.g., an alarm signal) or by a selection made by the viewer through either a designated button on the remote control or an icon on the screen.

Electronic games can be stored on the designated application channel computer server 710 in FIG. 7 and delivered to a user via the designated application channel at the user's request via a fee. Once the gaming option is activated, the customer needs to select the gaming icon on the supplemental display window or a designated button on the remote control to access the available games. There can be a broad range of offering of games. One level of games may be stand alone games and may be played in either of the main and supplemental display windows at the user's choice. Another level of games may be integrated games based on TV broadcasts that have been developed with interactivity in connection with the contents of the TV broadcasts. For example, an enhanced TV game served by the computer server 710 in FIG. 7 may be designed to play with a broadcast football game to allow the viewer to predict what may happen in the next five minutes of the football game, or compete with the contestants of a game show. Examples of suitable games for the designated application channel include arcade games, quizzes, strategy games, word puzzles, multi-player game on television, betting game on TV (e.g., Casinos, Poker, Bingo), and interactive games.

In addition, the designated application channel may also be used to provide premium Pay Per View Information (download) for various programming including new movie releases and sporting events.

Referring to the laser system example in FIG. 5A, a single laser module 510 is provided to produce one or more scanning laser beams 520 that excite light-emitting materials deposited on the screen 501 to produce color images. The one or more scanning laser beams 520 produced by the laser module 510 are modulated to carry images for the two or more display windows in response to the display control signal 245 that carries application channel and TV/Video channel data as illustrated in the example in FIG. 2. Alternatively, two or more different laser modules can be implemented to respectively control different display windows on the screen 501 with one display window per laser module.

Figure 10:
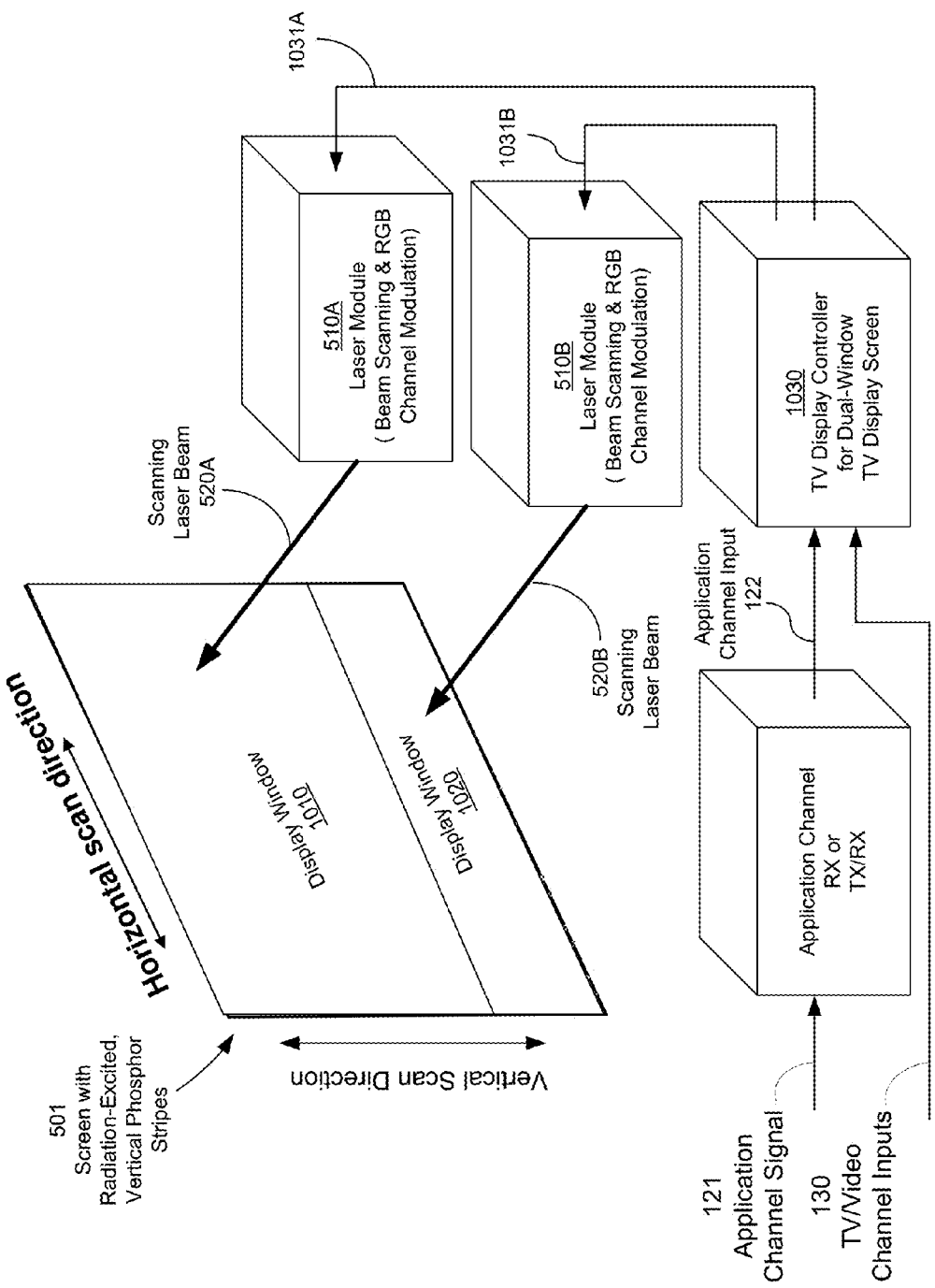
FIG. 10 shows an example of a scanning laser display system where two laser modules and 510B implemented to project images in two display windows on a common screen, respectively.

FIG. 10 shows an example of a scanning laser display system where two laser modules 510A and 510B are implemented to project images in two display windows 1010 and 1020 on the screen 501, respectively. The two display windows 1010 and 1020 are separate regions on the screen 501 and do not overlap with each other. The first laser module 510A is used to produce one or more scanning laser beams 520A that excite light-emitting materials in the display window 1010 on the screen 501 to produce color images that are generated specifically for the display window 1010. The second laser module 510B is used to produce one or more scanning laser beams 520B, that are separate from the beams 520A, to excite light-emitting materials in the display window 1020 on the screen 501 to produce color images that are generated specifically for the display window 1020. Accordingly, two separate display control signals 1031A and 1031B are generated to control the two laser modules 510A and 510B, respectively. The first display control signal 1031A carries the image information for the display window 1010 and the second display control signal 1031A carries the image information for the display window 1020.

In one implementation, two different display controllers may be provided to generate the first and second display control signals 1031A and 1031B, respectively. FIG. 10 shows a different implementation of the display control by using a single display controller 1030 to generate the first and second display control signals 1031A and 1031B that carry (1) the application channel input 122 and (2) the TV/Video Channel Inputs 120, respectively. The example in FIG. 10 shows two display windows. This configuration of using one laser module per display window can be applied to a system with 3 or more display windows on the screen.

The different laser modules 510A and 510B can be identical or have different configurations. For example, the laser modules 510A and 510B may be different from each other in one or more aspects such as the number of lasers and scanning laser beams, the scanning rates, and the power levels of the scanning laser beams 520A and 520B. This configuration of using one laser module per display window provides design flexibilities in such a display system.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented by using a TV remote control or other user control devices (e.g., a keyboard). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN"), a wide area network ("WAN"), e.g., the Internet, and a wireless communication network (e.g., a wireless cellular communication network).

A computer system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A display system based on scanning laser excitation beams, comprising:
   a display screen comprising a first display window at a first location on the screen to display images by emitting visible light from absorbing laser excitation light and a second display window at a second location on the screen without overlap with the first display window to display images by emitting visible light from absorbing laser excitation light;
   a first laser display module that produces and scans one or more first laser excitation beams carrying first images on the first display window, wherein the first laser display module includes first lasers to produce the one or more first laser excitation beams, a first beam scanning mechanism to scan the one or more first laser excitation beams horizontally and vertically on the first display window, and a first signal modulation mechanism to modulate the one or more first laser excitation beams to carry information for the first images;
   a second laser display module that is separate from the first display module, and produces and scans second laser excitation beams carrying second images on the second display window, wherein the second laser display module includes second lasers to produce the second laser excitation beams, a second beam scanning mechanism to scan the second laser excitation beams horizontally and vertically on the second display window, and a second signal modulation mechanism to modulate the second laser excitation beams to carry information for the second images; and
   a display control that is coupled to the first and second laser display modules and controls the first laser display module via a first display control signal applied to the first signal modulation mechanism and the second laser display module via a second display control signal applied to the second signal modulation mechanism to produce different display resolutions in the first and second display windows,
   wherein the first laser display module is different from the second laser display module in a number of lasers and scanning laser beams, scanning rates, and the power levels of the scanning laser beams;
   at least one TV and video input to receive a TV or video input channel for display on the display screen;
   a designated application channel receiver to receive a designated application channel that is independent from a broadcast TV programming channel; and
   a local memory that stores data received in the designated application channel;
   wherein the display controller that controls the first laser display module and the second laser display module, respectively, to control each frame displayed on the screen to have the TV or video input channel displayed on the first display window and the stored data in the designated application channel displayed in the second display window,
   wherein the display controller includes a switch mechanism to switch displayed contents between the first and the second display windows.

2. The system as in claim 1, wherein the designated application channel receiver is a wireless receiver which receives a wireless signal from a wireless communication network that carries the designated application channel.

3. The system as in claim 2, wherein the wireless communication network is a cellular network, a WiFi network under an IEEE 802.11 standard, or a WiMax network.

4. The system as in claim 1, wherein the display control coupled to the first and second laser display modules is configured to be operable to establish a communication link with a network to receive one or more TV programming channels and the designated application channel, and to deliver information over the designated application channel to the display screen to display in the first display window while simultaneously displaying a TV programming channel on the second display window.

5. The system as in claim 4, wherein the display control further includes a viewer control mechanism to allow a viewer to switch the information received from the designated application channel from the first display window to the second display window and switch back at the viewer's choice.

6. The system as in claim 4, wherein the display control further provides a viewer feedback from the display screen via a display remote control and a user graphic interface through the designated application channel to allow a viewer to send a viewer request or viewer data to the network via the communication link, to select a content of the data in the designated application channel to the display screen based on the viewer request or data.

7. The system as in claim 6, wherein the viewer request includes viewer preference for advertisements to be delivered through the designated application channel to the viewer's display.

8. The system as in claim 7, wherein the viewer data includes viewer demographic information or information on viewer's personal interests.

9. The system as in claim 8, wherein the advertisements delivered in the designated application channel are individualized to the viewer based on the viewer demographic information or information on viewer's personal interests.

10. The system as in claim 2, wherein the display controller is further configured to control downloading of data of the designated application channel through the wireless communication network to the local memory in one or more time periods when communication traffic is low in the wireless communication network.

11. The system as in claim 1, wherein:
each of the first and second display windows on the screen includes light-emitting materials to absorb excitation light and to emit light of colors to form images.

12. The system as in claim 1, wherein:
each of the first and second display windows on the screen includes light-emitting phosphor strips that absorb laser excitation light and to emit visible light of colors to form images, and
adjacent light-emitting phosphor strips emit visible light of different colors.

13. The system as in claim 1, wherein:
each of the first and second display windows on the screen includes light-emitting phosphor strips that absorb laser excitation light and to emit visible light of colors to form images, and
three adjacent light-emitting phosphor strips emit visible light of red, green and blue colors.

* * * * *